Jan. 18, 1955  E. P. MILAN  2,699,595
TOOLHOLDER
Filed May 11, 1950  2 Sheets-Sheet 1
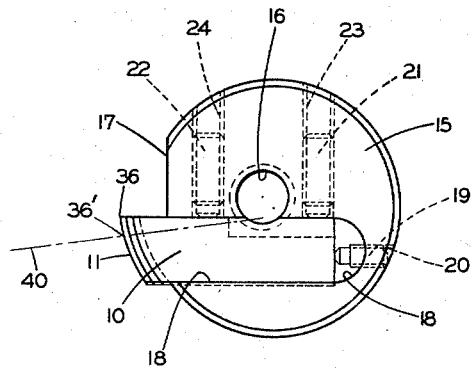
FIG. 2
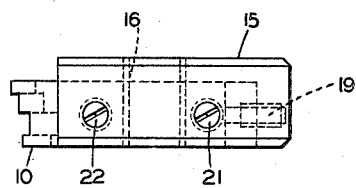
FIG. 3
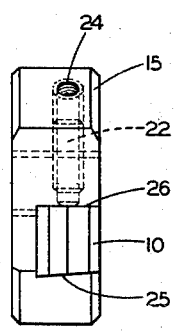
FIG. 4
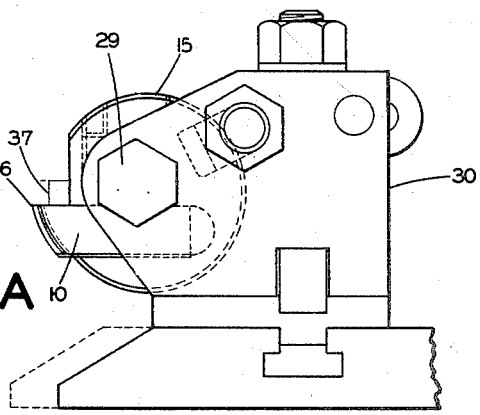
FIG. 5A
FIG. 5
FIG. 6A
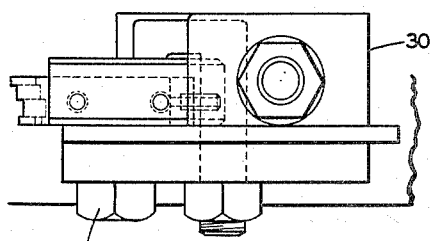
FIG. 6
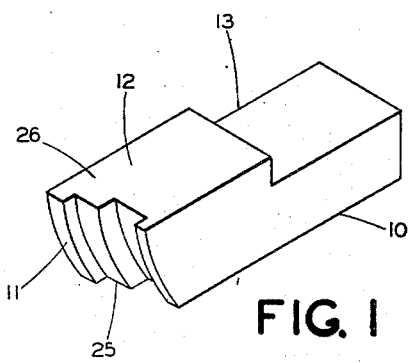
FIG. 1
INVENTOR.
EMIL P. MILAN
BY
*Eber J. Hyde*
ATTORNEY Jan. 18, 1955      E. P. MILAN      2,699,595
TOOLHOLDER Filed May 11, 1950      2 Sheets-Sheet 2

INVENTOR.
EMIL P. MILAN
BY
*Elees J. Hyde*
ATTORNEY

United States Patent Office 2,699,595
Patented Jan. 18, 1955

2,699,595

TOOLHOLDER

Emil P. Milan, Parma, Ohio

Application May 11, 1950, Serial No. 161,447

11 Claims. (Cl. 29—98)

This invention relates to tools, tool holders, and a grinding arbor for use with automatic screw machines and, more particularly, for use with the Brown & Sharpe automatic screw machine.

In the past, automatic screw machines have used circular tools ground to shape completely around the peripheral edge of the tool. A notch was cut out of the tool to form a cutting edge. After the cutting edge became dull due to repeated use, it was sharpened by grinding away a small portion of the tool and this sharpening could be repeated many times utilizing the tool material substantially completely around the peripheral edge. Such a circular tool is formed to the proper shape by mounting it in a holder which is rotated as a grinder grinds the proper shape into the edge of the circular tool. Tools of this type have a tremendously long length of life due to the large amount of material which may be ground away from the tool during successive sharpening operations. A tool of this type entails substantial cost which, of course, is not a disadvantage where a tremendously large number of pieces are made with the tool. However, it is often desirable, instead of making many tens of thousands of pieces, to utilize an automatic screw machine for making relatively small runs of a few thousand. A circular tool is quite expensive for these small runs.

It is an object of my invention to provide a tool bit, a tool holder, and a tool grinding fixture which together have all the advantages of a circular tool except the tremendously long tool life, but which are relatively inexpensive compared to the manufacture of a circular tool.

A further object of my invention is to provide a non-circular or straight tool bit for use with automatic screw machines.

Another object of the invention is to provide an auxiliary tool holder for holding this new tool bit in such a manner that many of the advantages of a circular tool are achieved in screw machine use without the high cost of a circular tool.

Another object of my invention is to provide a fixture for holding one or more of the new tool bits during manufacture on standard machines for manufacturing circular forming tools.

A further object of the invention is to provide an auxiliary tool holder for this new and improved tool bit which, when used on an automatic screw machine, provides the required amount of offset between the center of the tool and the center of the spindle.

A further object of the present invention is to provide a tool bit and an auxiliary tool holder therefor which may be mounted in a screw machine utilizing the standard radial difference charts which are well known in the art for circular tools.

For a better understanding of the present invention, together with other and further objects thereof, reference is had to the following description taken in connection with the accompanying drawings, and its scope will be pointed out in the appended claims.

In the drawings:

Fig. 1 is an isometric view showing a tool bit for an automatic screw machine;

Fig. 2 is a plan view showing the tool bit of Fig. 1 mounted in an auxiliary holder;

Fig. 3 is a view looking down on Fig. 2;

Fig. 4 is a view looking at the edge of Fig. 2;

Fig. 5 is a side view showing the auxiliary tool holder and bit of Fig. 2 mounted in a standard tool holder such as is used in a Brown & Sharpe automatic screw machine;

Fig. 5A shows a work piece and its position relative to the tool;

Fig. 6 is a view looking down on Fig. 5; and

Fig. 6A shows the relationship of the work piece with respect to Fig. 6;

Figure 7:
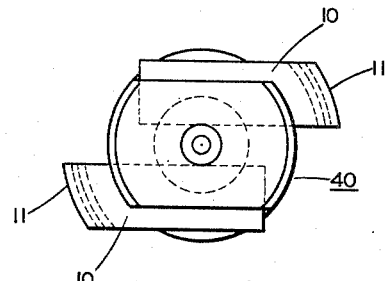
Fig. 7 is an end view of a grinding fixture holding two of the tool bits.

With reference to the drawings, there is shown in detail in Fig. 1 a tool bit, identified by reference character 10, comprised of a bar of tool steel or the like and having ground into its front or cutting edge 11 a shape which is to be used to machine a large number of work pieces. In the top face 12 of the tool bit 10 there is a relieved portion 13 which is cut away to provide clearance for a clamping bolt when the bit is secured into an auxiliary tool holder.

In Fig. 2, the tool bit 10 is shown mounted in the auxiliary holder 15. The auxiliary holder 15 has a threaded hole 16 extending through it to accommodate a bolt for securing the holder 15 to the tool post of a screw machine. The threaded hole 16 is off-center with respect to the center of the circular auxiliary tool holder 15. The auxiliary tool holder 15 is almost completely circular in shape and it has a flat face at one portion formed by cutting away the edge 17. An opening or channel 18 extends transversely into the tool holder 15 at the lower edge of the flat surface 17, and the tool bit 10 slides into this channel 18 until it is stopped by the set screw 19 which is in threaded engagement with the opening 20 in the back edge of the tool holder 15. The location of this set screw may be adjusted by turning it in order to accurately adjust the depth into the tool holder to which the tool bit 10 will slide. After the tool bit 10 has been pushed against the stop 19, two set screws 21 and 22, which extend in threaded holes 23 and 24, are tightened down onto tool bit 10 in order to hold it tightly within the auxiliary tool holder 15. As is shown most clearly in Fig. 4, the lower edge 25 of the tool bit 10 is inclined at an angle, for example about two degrees, with respect to the top edge 26. The channel 18 into the tool holder 15 is sloped at a similar angle in order to lock the tool bit 10 in place. The cut-away portion 13 in the top edge of the tool bit 10 substantially registers with the hole 16 extending through the tool holder to provide clearance for a bolt 29 which extends through the hole 16 to fasten the auxiliary tool holder 15 to the standard tool post 30.

The front or cutting edge 11 of the tool bit 10 is ground on an arc, as is clearly shown in Figs. 1, 2 and 5. The means for grinding this tool bit on a suitable arc are described later in detail.

When the tool bit 10 is properly positioned in the auxiliary tool holder 15, as is shown in Fig. 2, the center of the hole 16 is the center of the arc of the cutting face 11 of the tool bit. When the auxiliary holder 15 is mounted on the tool post 30 by means of the bolt 29 extending through the hole 16 in the auxiliary tool holder, the tool bit 10 is in proper position with respect to the work piece which is identified by reference character 35 in Fig. 5A. The work piece 35 in Fig. 5A is in proper position with respect to the tool post 30 of Fig. 5, and the center of the work piece 35 represents the center line of the spindle of the screw machine. It will be noted that the cutting edge 36 of the tool bit 10 is automatically aligned with the center of the spindle and is in proper position to operate on the work piece 35. The required amount of offset 37 is automatically provided between the center of the bolt 29 and the cutting edge 36 or 36' of the tool bit 10.

As the cutting edge 36 of the tool bit 10 becomes dull from operating on the work piece 35, it may be sharpened and a new cutting surface presented to the work piece 35. In order to properly sharpen the tool bit 10, it is ground in a sharpener in such a manner that a new top surface, illustrated by the dot-dash line 40' in Fig. 2, is provided. The entire auxiliary tool holder 15 is then rotated until the new cutting edge 36' is brought up into line with the center of the work spindle of the screw machine.

As shown in Fig. 6, the auxiliary tool holder 15 is connected to the tool post 30 with the tool bit 10 clamped between the auxiliary tool holder and the tool post. This position is satisfactory for holding a tool bit whose width dimension across the cutting edge is not large, but for wide tool bits it is advisable to reverse the position of the auxiliary tool holder. In the reversed position the auxiliary tool holder 15 is positioned between the tool post 30 and the tool bit 10, so that very wide tool bits may extend out beyond the confines of the opening 18 in the auxiliary tool holder 15.

Figure 8:
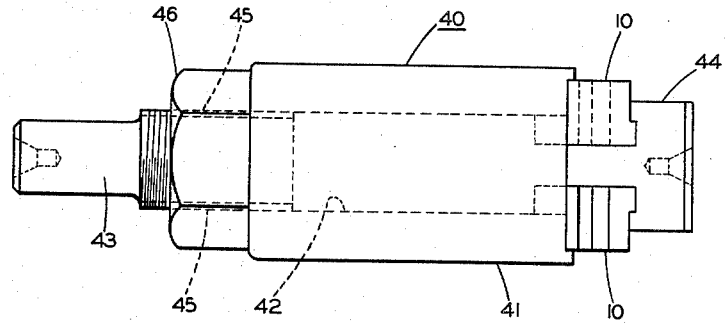
Figs. 8 and 9 are side views of the grinding fixture.
Figure 9:
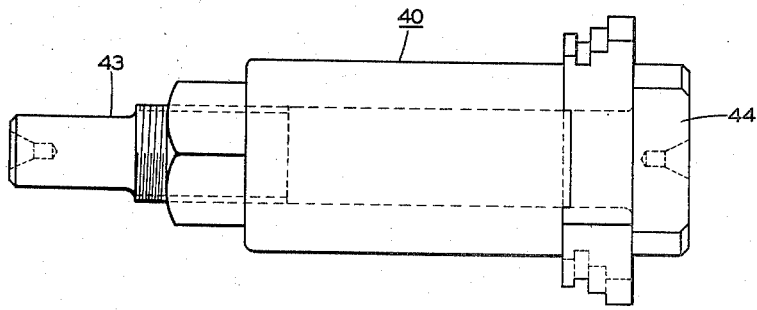

A plurality of the tool bits 10 may be simultaneously ground to the desired shape by means of the grinding fixture shown in Figs. 7, 8, and 9. The grinding fixture 40 is comprised of a main body portion 41 having a bore 42 extending through it. A clamping member 43 extends through the bore 42 and at one end it is provided with a clamping piece 44. The portion of the clamping member 43 which is positioned immediately outside of the body portion 41 is threaded, as shown by reference character 45. A nut 46 is screwed onto the threaded portion 45 of the clamping member 43. Two of the tool bits 10 are mounted symmetrically between the body portions 41 and the clamping member 44. The nut 46 is then tightened and the clamping member 44 tightly squeezes both of the tool bits 10 against the body portion 41. With the tool bits 10 secured in this position, the grinding fixture is mounted in a tool grinder in a manner well known to the art and the desired shape of the tool bits is ground into their front faces.

Because of this grinding fixture, it is possible to grind the desired arcuate curvature to the front faces 11 of one or more tool bits. This ground tool bit is then positioned in the auxiliary tool holder 15 having the off-center hole 16 extending through it and, by means of the bolt 29 through this off-center hole 16, the auxiliary tool holder 15 is secured to the standard well known tool post 30 with the proper distance between the center of the tool to the center of the spindle, and because of this construction and process, standard radial differential charts which have been made up for circular tools and which are in use throughout the industries may be used for the first time with a tool which is non-circular.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination; an auxiliary tool holder comprising a bit holding body having a hole extending through it to accommodate a bolt for clamping said body to a machine tool and having a bit channel in said body of a size to closely accommodate said bit extending in a direction transverse to the direction of said bolt hole and at a location offset with respect to said bolt hole; a tool bit having an arcuate cutting face and a body portion with at least two of its faces engaging two sides of said bit channel in said holding body; and means securing the body portion of said tool bit within said channel with said cutting face positioned outside of said body with the center of the arc of said cutting face located at the center of said bolt hole.

2. In combination; an auxiliary tool holder comprising a body having a hole extending through it to accommodate a bolt for clamping said body to a machine tool and having a bit channel in said body in a direction transverse to the direction of said bolt hole and at a location offset with respect to said bolt hole an amount such that said hole and said channel meet each other within said body; a tool bit having an arcuate cutting face and a body portion with a notch in one edge thereof; and means securing the body portion of said tool bit within said channel with said notch aligned with the bolt hole through said body to provide clearance between said bolt and said tool bit and with said cutting face positioned outside of said body with the center of the arc of said cutting face located at the center of said bolt hole.

3. In combination; an auxiliary tool holder comprising a single-piece plate-like body having a hole extending through it transverse to the major faces to accommodate a bolt for clamping said body to a machine tool, and having a bit channel in a major face of said body and at a location offset with respect to said bolt hole, the bottom surface of the bit channel sloping downwardly and inwardly into said body at a given small angle; a tool bit having an arcuate cutting face and a body portion which is substantially rectangular in cross-section except for the bottom face thereof which slopes with respect to the top face substantially at said given small angle; and means securing said tool bit within said bit channel in said body with the said bottom face of the bit in engagement with the said bottom surface of the bit channel and with said cutting face positioned outside of said body with the center of the arc of said cutting face located at the center of said bolt hole.

4. The combination set forth in claim 3, further characterized by said tool bit having a notch in the top body portion at a location which substantially registers with the bolt hole through said body when said bit is mounted in operative position in said body.

5. In combination, an auxiliary tool holder comprising a plate-like body which is round in plan except for a flat front edge face and having a bolt hole extending through it transverse to the major faces and off-center with respect to said round plate-like body to accommodate a bolt for clamping said body to a machine tool and having a three-sided bit channel in said body open at one side into a major face, said bit channel being located below said bolt hole and extending to the edge face of said body at the bottom edge of said flat front edge face; a tool bit having an arcuate cutting face and a body portion; and means securing said tool bit within said bit channel with said cutting faces positioned outside of said body at the bottom edge of said front flat face and with the center of the arc of said cutting face located at the center of said bolt hole.

6. The combination set forth in claim 5, further characterized by the bottom surface of the bit channel in said body sloping downwardly and inwardly into said body at a given small angle with respect to horizontal, and by said tool bit having a bottom face which, when the bit is properly mounted within said holder, slopes downwardly and inwardly with respect to said holder at substantially said given small angle.

7. The combination set forth in claim 6, further characterized by set screw means adjustably secured to said body at a location above said tool bit channel and extending down onto the top face of said tool bit to forcibly hold the tool bit down against said sloping bottom surface of the bit channel.

8. A tool bit for use with an auxiliary tool holder as described comprising a tool body having an arcuate cutting face and having a notch in its uper edge portion, the center of said arcuate cutting face being located outside of said body at a point above said notch.

9. A tool bit for use with an auxiliary tool holder as described comprising a bar-shaped tool body having an arcuate cutting face and having a notch in its upper edge portion, the center of said arcuate cutting face being located outside of said bar at a point above said notch.

10. A tool bit comprising a bar-shaped tool body having an arcuate cutting face at one end the center for which arc is located outside of and above said body, and defining in transverse cross-section a quadrilateral whose bottom face when properly mounted in a tool holder slopes downwardly and inwardly.

11. A tool bit comprising a bar-shaped tool body having an arcuate cutting face at one end the center for which arc is located outside of and above said body, and defining in transverse cross-section a quadrilateral having substantially parallel side faces perpendicular to the top face and having a bottom face which is inclined to the top face at an angle of about 2 degrees.

References Cited in the file of this patent

UNITED STATES PATENTS

| 686,134 | Rogers | Nov. 5, 1901 |
| 902,169 | Richards | Oct. 27, 1908 |
| 1,419,875 | Madsen | June 13, 1922 |
| 1,611,514 | Cox | Dec. 21, 1926 |
| 1,721,129 | Mehl | July 16, 1929 |
| 1,998,893 | Cole | Apr. 23, 1935 |
| 2,181,137 | Lambright | Nov. 28, 1939 |
| 2,211,039 | Welter | Aug. 13, 1940 |
| 2,278,988 | Groene | Apr. 7, 1942 |
| 2,520,205 | Girardin | Aug. 29, 1950 |
| 2,550,949 | Weidner | May 1, 1951 |

FOREIGN PATENTS

| 97,678 | Germany | June 22, 1898 |
| 664,771 | Germany | Sept. 5, 1938 |